US010353519B2

United States Patent
Kawazoe et al.

(10) Patent No.: US 10,353,519 B2
(45) Date of Patent: Jul. 16, 2019

(54) INPUT CONTROL METHOD AND ELECTRONIC DEVICE

(71) Applicant: Panasonic Intellectual Property Management Co., Ltd., Osaka (JP)

(72) Inventors: Shin Kawazoe, Hyogo (JP); Noriyuki Hidaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/462,382

(22) Filed: Mar. 17, 2017

(65) Prior Publication Data

US 2017/0192615 A1 Jul. 6, 2017

Related U.S. Application Data

(63) Continuation of application No. PCT/JP2015/004683, filed on Sep. 15, 2015.

(30) Foreign Application Priority Data

Sep. 25, 2014 (JP) .................................. 2014-195492

(51) Int. Cl.
*G06F 3/041* (2006.01)
*G06F 3/045* (2006.01)
(Continued)

(52) U.S. Cl.
CPC ........ *G06F 3/0418* (2013.01); *G06F 3/03547* (2013.01); *G06F 3/0488* (2013.01)

(58) Field of Classification Search
CPC ..... G06F 3/0418; G06F 3/0488; G06F 33/044
See application file for complete search history.

(56) References Cited

U.S. PATENT DOCUMENTS 9,665,186 B2 *  5/2017  Serizawa ............ G06F 3/03543
2010/0291973 A1 * 11/2010 Nakahara ................ G06F 3/044
                                                                    455/566
(Continued)

FOREIGN PATENT DOCUMENTS

JP        2011-100486         5/2011
JP        2011-138218         7/2011
(Continued)

OTHER PUBLICATIONS

International Search Report of PCT application No. PCT/JP2015/004683 dated Dec. 1, 2015.

*Primary Examiner* — Nan-Ying Yang
(74) *Attorney, Agent, or Firm* — Hamre, Schumann, Mueller & Larson, P.C.

(57) ABSTRACT

An electronic device includes a touch operation part that enables information to be input by touch operation to a predetermined input region, and a controller that controls validation and invalidation of an input function of the touch operation part. The controller invalidates the input function to a partial region in the input region of the touch operation part, validates the input function to the partial region in a predetermined period, when predetermined touch operation is performed to a specific region where the input function in the input region is valid, while the input function to the partial region is invalidated, and invalidates the input function to the partial region after the predetermined period has passed.

10 Claims, 13 Drawing Sheets

(51) Int. Cl.
*G06F 3/0354* (2013.01)
*G06F 3/0488* (2013.01)

(56) References Cited

U.S. PATENT DOCUMENTS

2011/0242040 A1 * 10/2011 Nutaro .................. G06F 3/0418
　　　　　　　　　　　　　　　　　　　　345/174
2013/0147771 A1　　6/2013　Chuang et al.

FOREIGN PATENT DOCUMENTS

| JP | 2013-045216 | | | 3/2013 |
|---|---|---|---|---|
| JP | 2013045216 | A | * | 3/2013 |
| JP | 2013-120593 | | | 6/2013 |
| JP | 2013-145444 | | | 7/2013 |
| JP | 2013-186858 | | | 9/2013 |

* cited by examiner

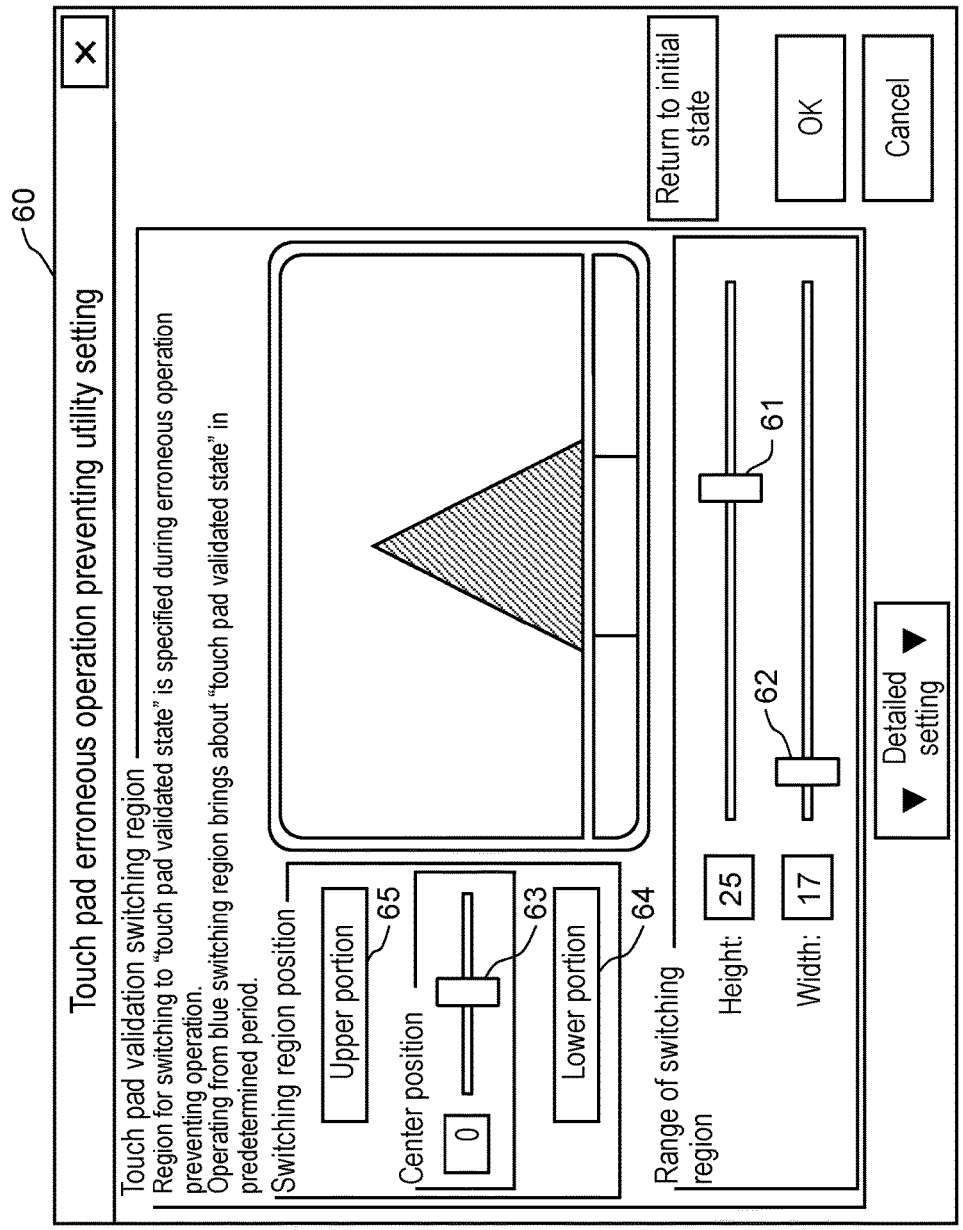

INPUT CONTROL METHOD AND ELECTRONIC DEVICE

BACKGROUND

1. Technical Field

The present disclosure relates to a method for controlling an input device configured to input information by touch operation, and an electronic device including the input device.

2. Description of the Related Art

In recent years, various electronic devices including touch pads that perform input of information by touch operation as input means have been widely used (see Unexamined Japanese Patent Publication Nos. 2011-138218, 2013-186858, 2013-145444, 2013-120593, and the like). For example, Unexamined Japanese Patent Publication No. 2011-138218 has disclosed a notebook type personal computer including a touch pad in addition to a keyboard as input means. Moreover, Unexamined Japanese Patent Publication No. 2013-186858 and No. 2013-145444 each have disclosed a steering of an automobile and a camera, each provided with a touch pad as input means, respectively.

SUMMARY

An electronic device according to the present exemplary embodiment includes a touch operation part that enables information to be input by touch operation to a predetermined input region, and a controller that controls validation and invalidation of an input function of the touch operation part. The controller invalidates the input function to a partial region in the input region of the touch operation part, validates the input function to the partial region in a predetermined period, when predetermined touch operation is performed to a specific region where the input function in the input region is valid, while the input function to the partial region is invalidated, and invalidates the input function to the partial region after the predetermined period has passed.

An input control method according to the present disclosure is a method for controlling an input device including a touch operation part that enables information to be input by touch operation to a predetermined input region. The input control method includes invalidating an input function to a partial region in the input region, validating the input function to the partial region in a predetermined period, if predetermined touch operation is performed to a specific region where the input function in the input region is valid, while the input function in the partial region is invalidated, and invalidating the input function to the partial region after the predetermined period has passed. According to the present disclosure, when the input function is invalidated in the partial predetermined region of the touch operation part, when the predetermined operation is accepted in the region where the input is valid, the input function of the predetermined region is temporarily validated. Since this can invalidate the function of the region where erroneous operation is easily performed in the touch operation part, the erroneous operation can be reduced. Moreover, the relevant region can be validated when input is needed, which can assure convenience of the user to the touch operation part.

BRIEF DESCRIPTION OF THE DRAWINGS

FIG. 6 is a flowchart showing temporary validation processing to an invalidation region R2 when a touch pad erroneous operation preventing function is turned on;

FIG. 8 is a diagram showing a setting screen (GUI) of the touch pad erroneous operation preventing function;

DETAILED DESCRIPTION

Hereinafter, with reference to the drawings as needed, exemplary embodiments will be described in detail. However, more detailed description than necessary may be omitted. For example, detailed description of a well-known item or overlapping description of substantially the same configuration may be omitted. This is to avoid unnecessary redundancy of the following description, and to facilitate understanding of those in the art. The accompanying drawings and the following description are provided for those in the art to sufficiently understand the present disclosure, and are not intended to limit the subject described in the claims.

First Exemplary Embodiment

1. Configuration

An information processing device described below is one example of an electronic device, and is a personal computer that implements a predetermined function by executing a program.

Figure 1:
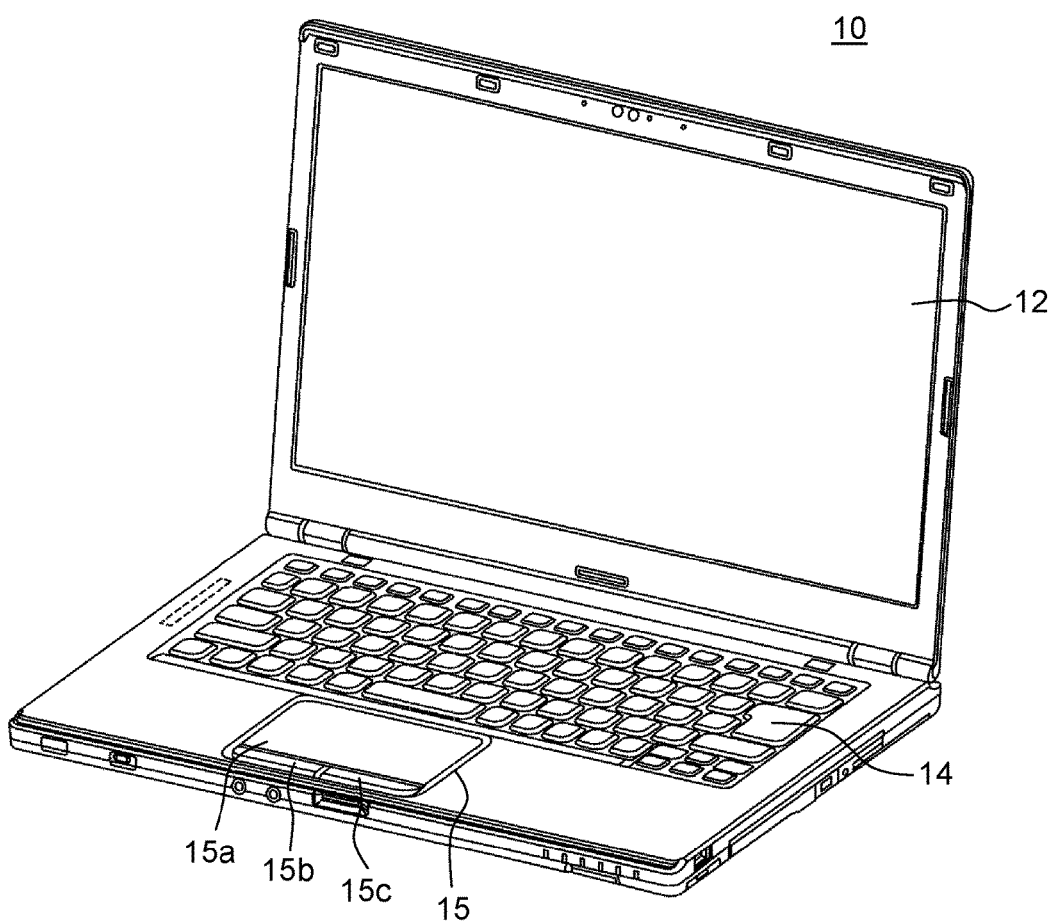
FIG. 1 is a perspective view of an information processing device in a first exemplary embodiment.

FIG. 1 is a perspective view of the information processing device in a first exemplary embodiment of the present disclosure. Information processing device 10 includes display 12, keyboard 14, and touch input part 15. Display 12 is configured, for example, by a liquid crystal display panel or an organic ElectroLuminescence (EL) panel.

Touch input part 15 includes touch pad 15a, and buttons 15b, 15c. Touch pad 15a is a touch panel in an electrostatic induction system, and touching the panel with a finger of a user or the like allows input of an instruction to information processing device 10 to be performed. Upon detecting touch operation with the finger of the user, touch pad 15a outputs a detection signal indicating a content of the touch operation. Buttons 15b, 15c are pressing buttons, and for example, each implement an input function corresponding to click operation of a button of a mouse. Touch pad 15a can accept gesture operation with the finger of the user, such as tap, pinch, stretch, slide, swipe and the like. Using this touch pad enables the user to give various instructions of cursor movement, screen scroll, enlargement of a screen and the like to information processing device 10.

Figure 2:
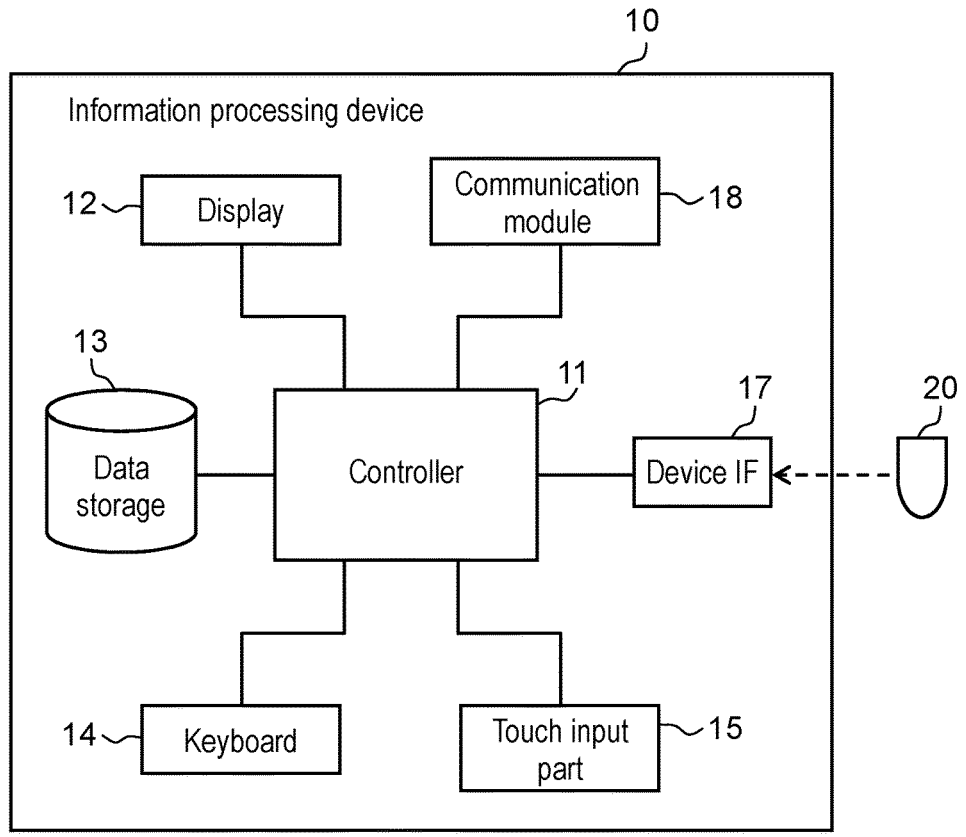
FIG. 2 is a diagram showing an internal configuration of the information processing device.

FIG. 2 is a diagram showing an electric configuration of information processing device 10. Information processing device 10 includes controller 11, display 12, data storage 13, device interface 17, and communication module 18.

Controller 11 is configured by a central processing unit (CPU), a micro processing unit (MPU) or the like to implement various functions by executing a program.

Data storage 13 is a device that stores data, and is configured by a solid state drive (SSD), or a hard disk drive (HDD). Data storage 13 stores an operating system, drivers and utilities for driving various devices, application programs, and data.

Device interface 17 is an interface for connecting other devices in conformity with a standard such as a universal serial bus (USB), a high definition multimedia interface (HDMI) (registered trademark), Institute of Electrical and Electronic Engineers (IEEE) 1394 and the like. As the other devices, an external input device such as mouse 20, a printer, an external hard disk and the like are cited.

Communication module 18 is a module for performing communication with other devices in conformity with a wired local area network (LAN) standard such as IEEE802.3 and the like, or a wireless LAN standard such as WiFi, IEEE802.11 and the like. Communication module 18 may include a module for connecting a public communication line in a 3G communication method or the like.

Figure 3:
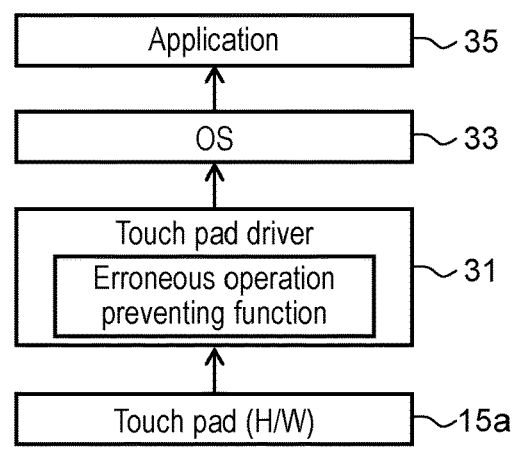
FIG. 3 is a diagram for describing a software configuration in the information processing device.

FIG. 3 is a diagram for describing a software configuration in information processing device 10 with respect to operation of touch pad 15a. Touch pad driver 31 is software that converts a detection signal from touch pad 15a to information indicating the touch operation, which information the operating system can process, and outputs the information to operating system (OS) 33. Particularly, touch pad driver 31 has a function of invalidating input (the touch operation) to a predetermined input region of touch pad 15a (described in detail later). Operating system 33 transmits the information received from touch pad driver 31 to application 35. Application 35 performs processing, based on the information received from operating system 33.

2. Operation 2.1 Invalidation Operation of Touch Pad

Figure 4:
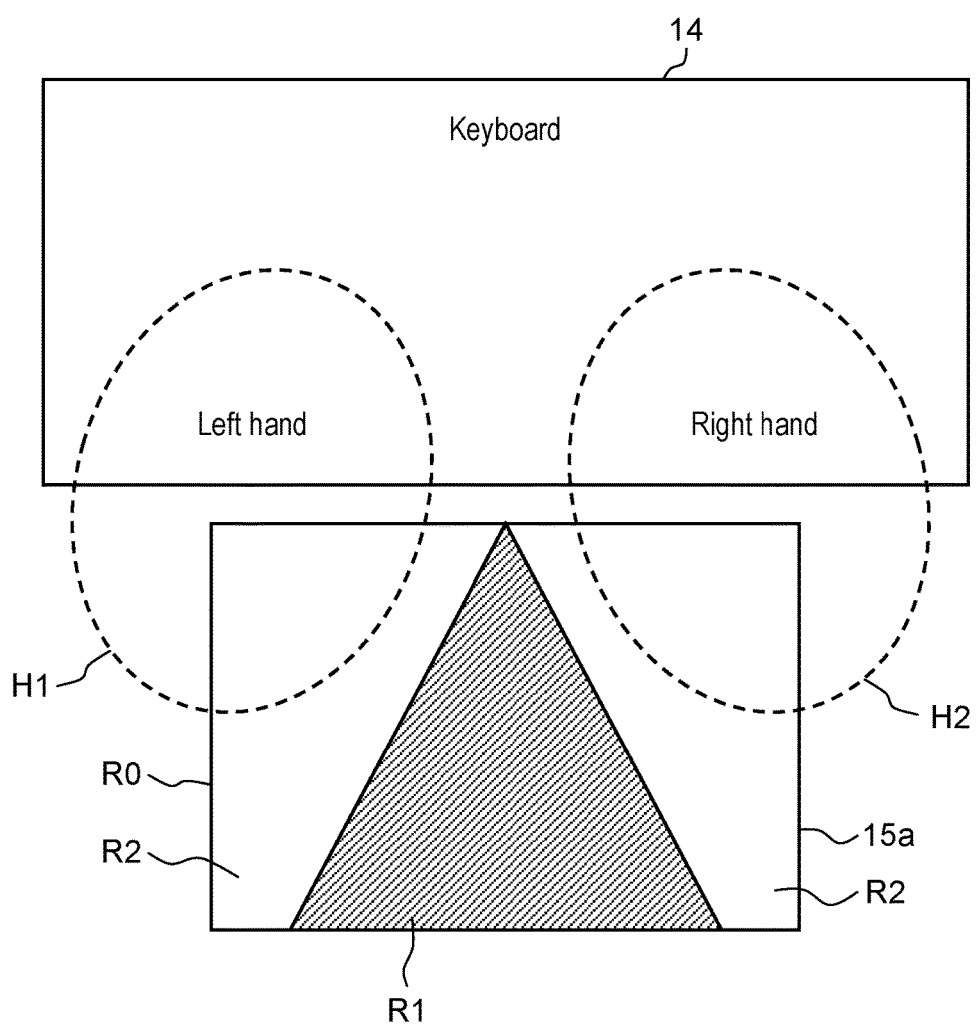
FIG. 4 is a diagram for describing a specific region where an input function is invalidated in an input region of a touch pad.

Hereinafter, processing regarding an input function of touch pad 15a in information processing device 10 of the present exemplary embodiment will be described. Information processing device 10 of the present exemplary embodiment has a function of invalidating input to a part of the input region of touch pad 15a to reduce erroneous operation to touch pad 15a (hereinafter, referred to as a "touch pad erroneous operation preventing function"). FIG. 4 is a diagram for describing regions where the input function is invalidated in the input region of touch pad 15a. In information processing device 10 of the present exemplary embodiment, in entire input region R0 of touch pad 15a, regions considered to have a high possibility that left hand H1 and right hand 112 of the user touch the relevant regions are set as the regions where the input function is invalidated (hereinafter, referred to as "invalidation regions R2").

ON/OFF of the touch pad erroneous operation preventing function is switched by setting. When the touch pad erroneous operation preventing function is turned on, basically, only the touch operation by the user in switching region R1 of touch pad 15a is accepted. On the other hand, when the touch pad erroneous operation preventing function is turned off, the touch operation by the user is accepted in entire input region R0 of touch pad 15a.

Figure 5:
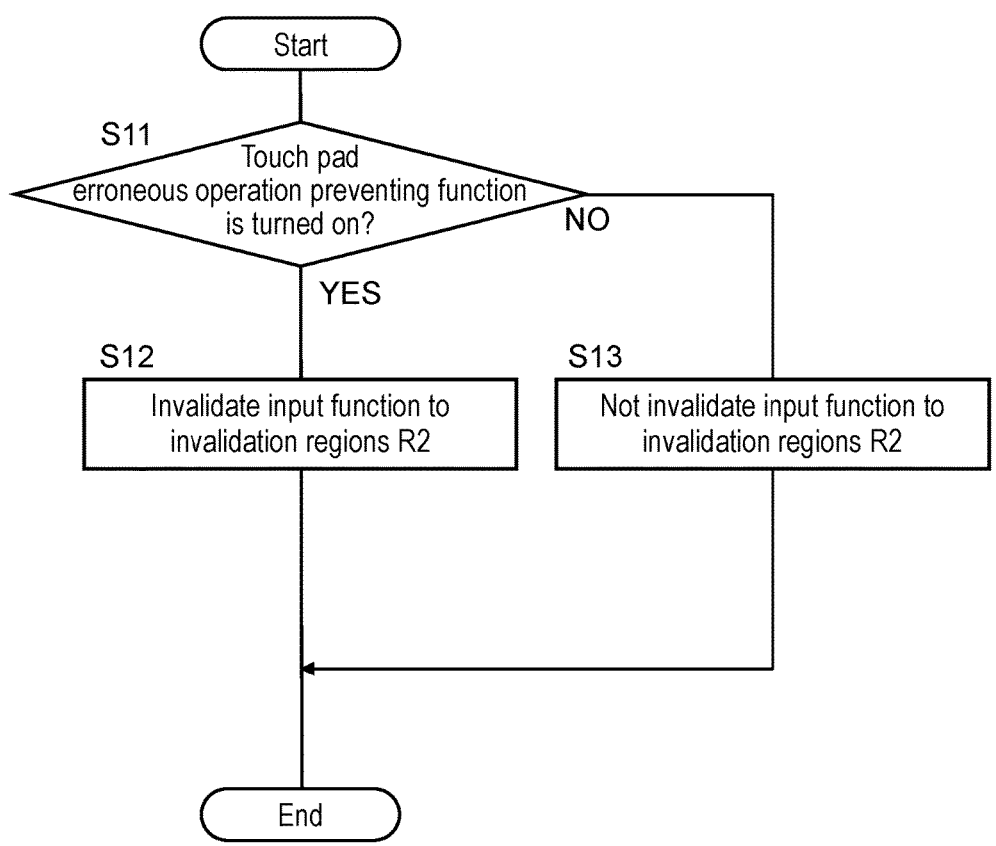
FIG. 5 is a flowchart showing validation and invalidation of the input function of the touch pad.

Hereinafter, referring to a flowchart of FIG. 5, the invalidation processing to invalidation regions R2 of touch pad 15a in information processing device 10 will be described. The present processing and processing described later (description with reference to FIG. 6) are implemented by controller 11 executing touch pad driver 31.

Controller 11 determines whether or not the touch pad erroneous operation preventing function is set to ON (S11). When the touch pad erroneous operation preventing function is set to ON (YES in S11), controller 11 invalidates the input function to invalidation regions R2 (S12). The invalidation of the input function to invalidation regions R2 inhibits controller 11 from accepting, as input, the touch operation input to invalidation regions R2 of touch pad 15a.

On the other hand, when the touch pad erroneous operation preventing function is set to OFF (NO in S11), controller 11 does not invalidate the input function to touch pad 15a (S13). In this case, controller 11 accepts the touch operation to entire input region R0 of touch pad 15a as input.

As described above, if the touch pad erroneous operation preventing function is set to ON, the touch operation by the user in invalidation regions R2 of touch pad 15a is basically invalidated. However, even if the touch pad erroneous operation preventing function is set to ON, when the user performs specific operation in a specific region where input is valid, the touch operation by the user in invalidation regions R2 of touch pad 15a is validated only in a certain period. Here, in the present exemplary embodiment, the specific region is a region other than invalidation regions R2 in entire input region R0. The specific region may be set to a part of a region where the input is valid in entire input region R0. Moreover, the specific operation is a single tap or long pressing operation (operation that continues touching touch pad 15a in a certain period). In this manner, the specific region is a region for switching the input (the touch operation) to invalidation regions R2 from "invalid" to "valid", hereinafter, the specific region is referred to as "switching region R1".

Figure 6:
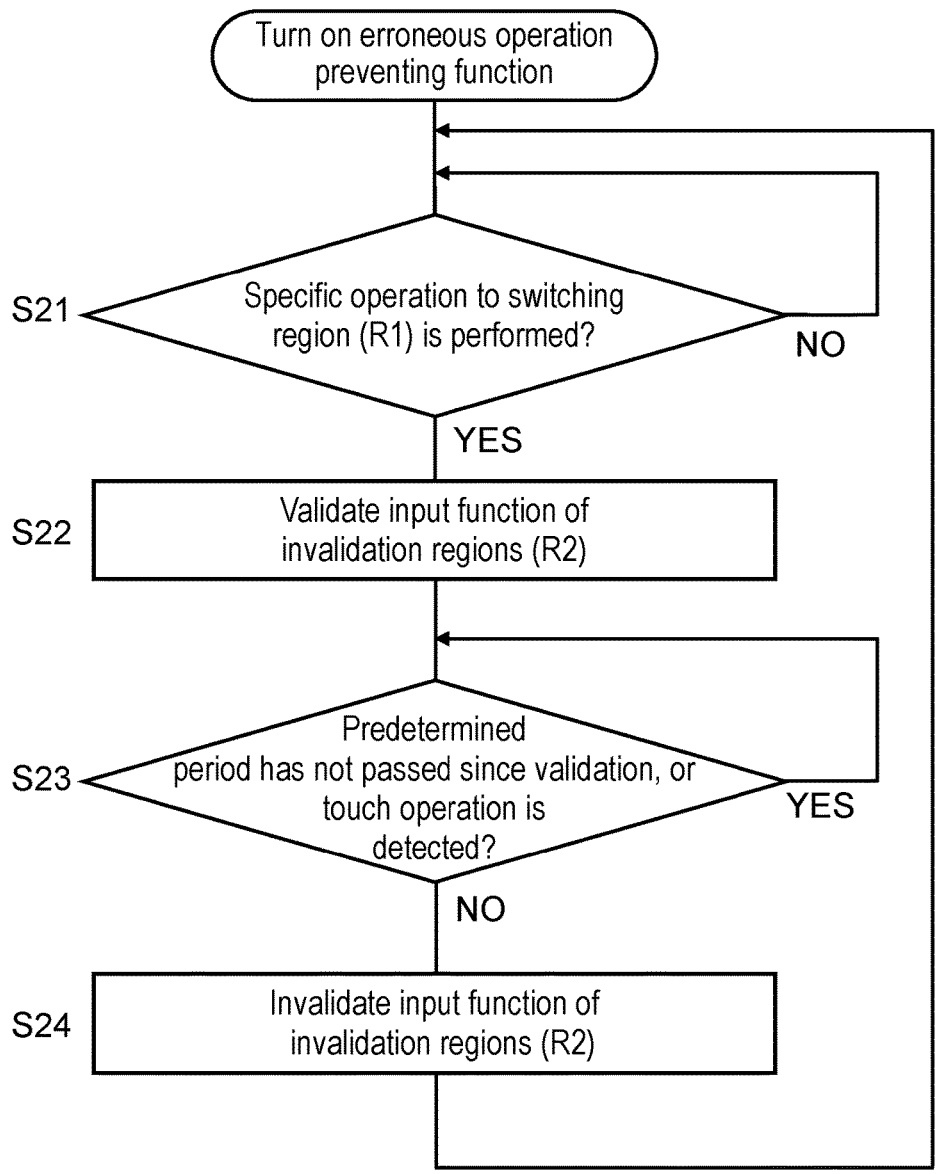

Hereinafter, with reference to FIG. 6, temporary validation operation of the invalidation region will be described. FIG. 6 is a flowchart showing the temporary validation processing to invalidation regions R2 of touch pad 15a, when the touch pad erroneous operation preventing function is set to ON.

Controller 11 determines whether or not the predetermined operation of the user (the single tap or the long pressing operation) has been performed to switching region R1 (21).

When the predetermined operation is performed to switching region R1 by the user (YES in S21), the input function of invalidation regions R2 is validated (S22). Until a predetermined period has passed since the validation, or while the touch operation to touch pad 15*a* is detected (YES in S23), controller 11 maintains the validation of the input function of invalidation regions R2. On the other hand, when the predetermined period has passed since the validation, and the touch operation to touch pad 15*a* is not detected (NO in S23), controller 11 returns the input function to invalidation regions R2 to invalidation (S24).

In this manner, in the present exemplary embodiment, when invalidation regions R2 are invalidated, when the predetermined operation is performed by the user in switching region R1, the input function of invalidation regions R2 in touch pad 15*a* is temporarily validated. Thereby, when the user has no intention to use touch pad 15*a*, invalidation regions R2 easy to cause erroneous operation are invalidated, by which the user can reduce erroneous operation. On the other hand, when the user wants to use touch pad 15*a*, performing the predetermined operation allows the user to use entire touch pad 15*a*. This can increase convenience of the user to touch pad 15*a* while reducing erroneous operation in touch pad 15*a*.

Figure 7:
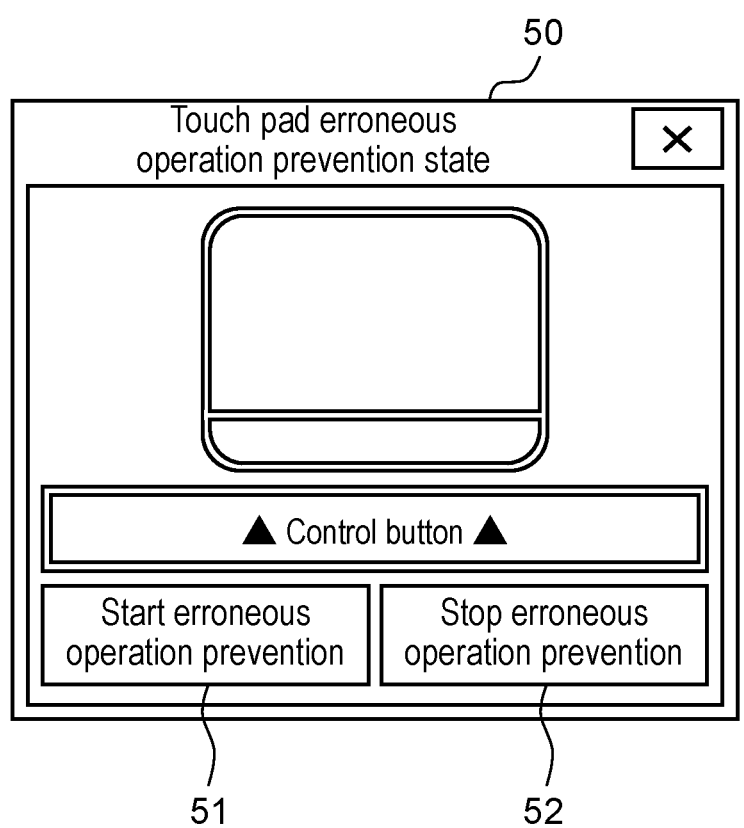
FIG. 7 is a diagram showing a setting screen (GUI) of the touch pad erroneous operation preventing function.

2.2 Setting Screen (1) ON/OFF Setting of Touch Pad Erroneous Operation Preventing Function FIG. 7 is a diagram showing a setting screen (GUI) for performing the setting of ON/OFF of the touch pad erroneous operation preventing function. The user can operate buttons 51, 52 on setting screen 50 to thereby set ON/OFF of the touch pad erroneous operation preventing function. Controller 11 validates the input function of the external input device such as mouse 20 and the like regardless of ON/OFF of the touch pad erroneous operation preventing function.

Figure 9A:
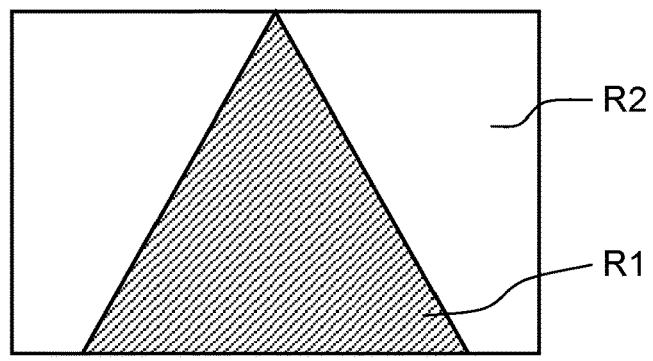
FIG. 9A is a diagram for describing change of a size of a switching region.
Figure 9B:
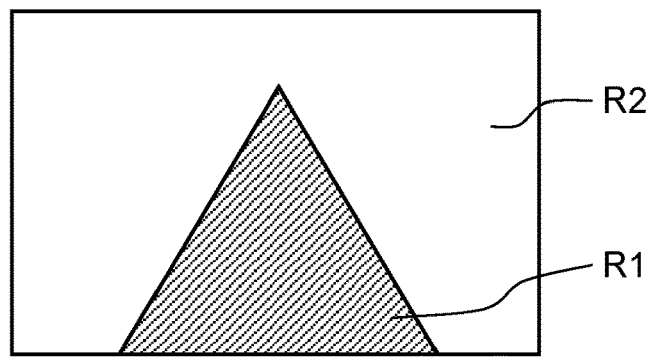
FIG. 9B is a diagram for describing change of the size of the switching region.
Figure 9C:
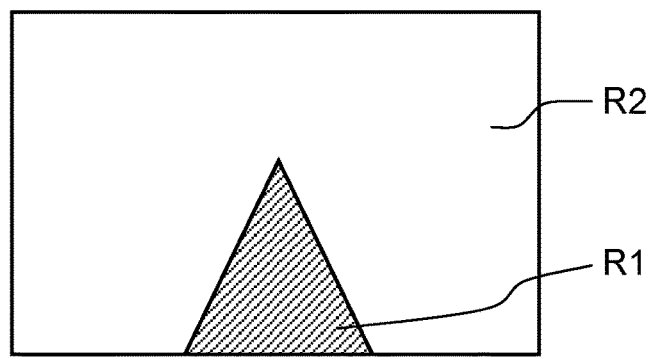
FIG. 9C is a diagram for describing change of the size of the switching region.
Figure 10A:
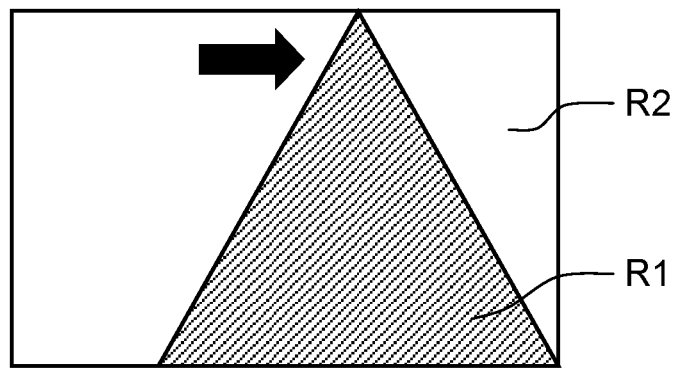
FIG. 10A is a diagram for describing change of a position of the switching region.
Figure 10B:
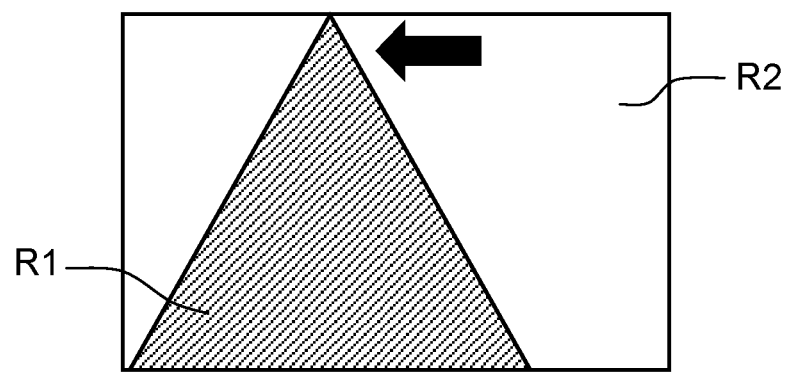
FIG. 10B is a diagram for describing change of the position of the switching region.
Figure 11A:
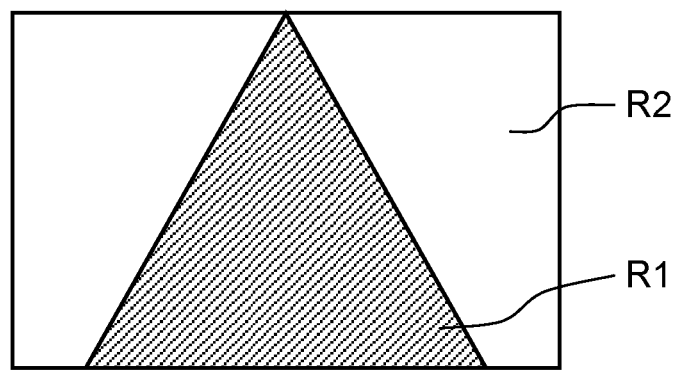
FIG. 11A is a diagram for describing change of disposition of the switching region.
Figure 11B:
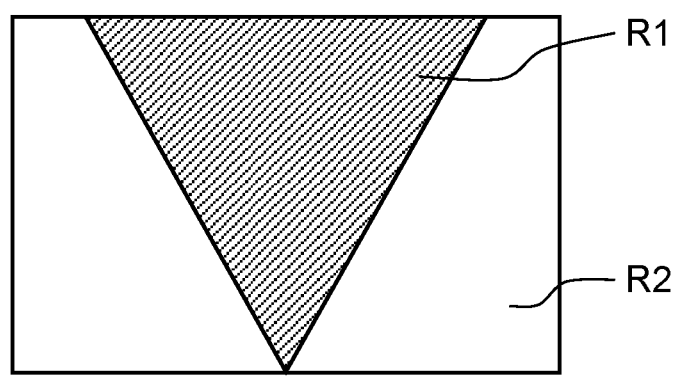
FIG. 11B is a diagram for describing change of the disposition of the switching region.

(2) Various Types of Setting of Touch Pad Erroneous Operation Preventing Function FIG. 8 is a diagram showing a setting screen for performing various types of setting (a position, a size, a shape) in touch pad erroneous operation preventing function. In setting screen 60 in FIG. 8, a position, a size and the like of switching region R1 can be changed. For example, sliding sliders 61, 62 in setting screen 60 can change a height and a width of switching region R1, as shown in FIGS. 9A to 9C. Moreover, sliding slider 63 can shift the position of switching region R1 in a horizontal direction, as shown in FIGS. 10A, 10B. Moreover, operating buttons 64, 65 in setting screen 60 can turn switching region R1 upside down, as shown in FIGS. 11A, 11B. Controller 11 changes the size, the position and the like of switching region R1, based on the setting by the user on setting screen 60.

Figure 12:
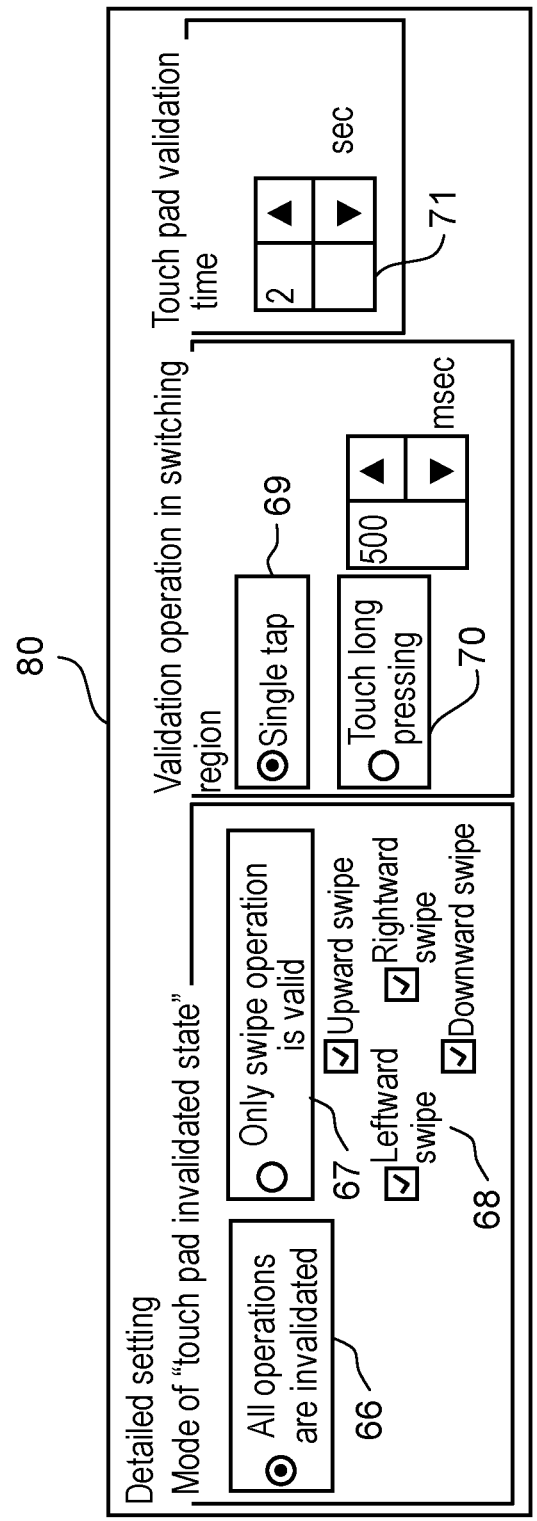
FIG. 12 is a diagram for describing a setting screen (GUI) of the touch pad erroneous operation preventing function.

Even if the input is input to invalidation regions R2, as to a part of gesture operation, the input may be accepted. For example, even if input of swipe operation is performed to invalidation regions R2, the relevant input may be accepted. In Windows 8 (registered trademark) by Microsoft Corporation, a charm can be displayed by performing swipe at a right end in the input region of the touch panel (the touch pad). The swipe for displaying the above-described charm is operated by invalidation regions R2. Thus, as to the swipe, even the input in the invalidation region is accepted, by which the convenience of the user can be assured when the charm is displayed. In this case, in a lower portion of setting screen 60 shown in FIG. 8, GUI 80 including various types of buttons 66, 67, ... as shown in FIG. 12 may be further displayed. With buttons 66, 67, whether all operations are to be invalidated, or a part of operation (in the present example, the swipe operation) is not to be invalidated can be set. Moreover, check box 68 can set in which region of upper-lower and right-left regions the swipe is to be validated.

Moreover, in GUI 80 shown in FIG. 12, specific operation for temporarily validating the input function of invalidation regions R2 can be set. Specifically, buttons 69, 70 enable the two types of operation of the single tap and/or the long pressing operation to be set as the predetermined operation. Moreover, input box 71 enables the predetermined period to be set when the input function of invalidation regions R2 is temporarily validated.

Controller 11 performs various types of setting regarding the touch pad erroneous operation preventing function, based on various types of setting made by the user on setting screens 60, 80.

3. Conclusion

Information processing device 10 of the present exemplary embodiment (one example of an electronic device) includes touch pad (one example of a touch operation part) 15*a* that enables information to be input by the touch operation to entire input region R0 (one example of a predetermined input region), and controller 11 (one example of a controller) that controls validation and invalidation of the input function of touch pad 15*a*. Controller 11 invalidates the input function to invalidation regions R2 (one example of a partial region) in entire input region R0 of touch pad 15*a* (S12). While the input function to invalidation regions R2 is invalidated, if the predetermined touch operation is performed to switching region R1 where the input function is valid (one example of a specific region) (YES in S21), controller 11 validates the input function to invalidation regions R2 (S22) in the predetermined period (S23), and invalidates the input function to invalidation regions R2 after the predetermined period has passed (S24).

Moreover, the input control method of the present exemplary embodiment is a method for controlling touch input part 15 (one example of an input device) including touch pad 15*a* that enables information to be input by the touch operation to the predetermined input region. In the input control method, the input function to invalidation regions R2 which are parts of entire input region R0, is invalidated, and while the input function to invalidation regions R2 is invalidated, when the predetermined touch operation is performed to switching region R1 in which the input in entire input region R0 is valid, the input function to invalidation regions R2 is validated in the predetermined period, and after the predetermined period has passed, the input function to invalidation regions R2 is invalidated.

As described above, in invalidation regions R2, which are parts of touch pad 15*a*, the input function is invalidated, and when the predetermined operation is accepted in switching region R1 where the input is valid, the input function of invalidation regions R2 is temporarily validated. Since this can invalidate the function of invalidation regions R2 where normally, the erroneous operation is easily caused in touch pad 15*a*, the erroneous operation can be reduced, and when the input becomes necessary, invalidation regions R2 can be validated, which can assure the convenience of the user to touch pad 15*a*.

Other Exemplary Embodiments

As described above, as an illustration of the technique disclosed in the present application, the first exemplary embodiment has been described. However, the technique in the present disclosure is not limited thereto, but can be applied to exemplary embodiments obtained by making modifications, replacements, additions, omissions, and the like. Moreover, the components described in the first exemplary embodiment can also be combined to make a new exemplary embodiment.

Consequently, hereinafter, other exemplary embodiments will be illustrated.

Figure 13A:
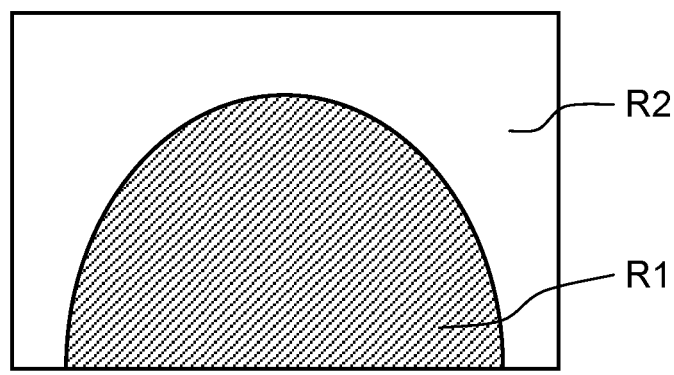
FIG. 13A is a diagram for describing variation of a shape of the switching region.
Figure 13B:
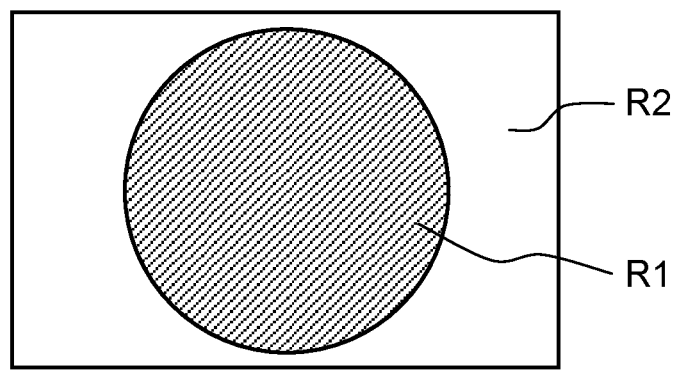
FIG. 13B is a diagram for describing variation of the shape of the switching region.

While in the above-described exemplary embodiment, a shape of the switching region is triangular, the shape of the switching region is not limited thereto. Any shape having a low possibility that the user erroneously touches the touch pad during operation of keyboard 14 can be employed. For example, the shape may be semicircular as shown in FIG. 13A, or may be circular shown in FIG. 13B.

While in the above-described exemplary embodiment, the number of types of the predetermined operation for temporarily validating the input function of invalidation regions R2 is two, that is, the single tap and the long pressing operation, the predetermined operation is not limited thereto. Other types of gesture operation such as double tap, multi-touch in which a plurality of fingers touch the touch pad, and the like may be employed.

While in the above-described exemplary embodiment, the example has been described in which the touch pad erroneous operation preventing function is provided by touch pad driver 31, this function may be implemented by application software different from touch pad driver 31. For example, as shown in FIGS. 14A, 14B, erroneous operation preventing application 39 provided apart from touch pad driver 31 may provide the foregoing touch pad erroneous operation preventing function.

Figure 14A:
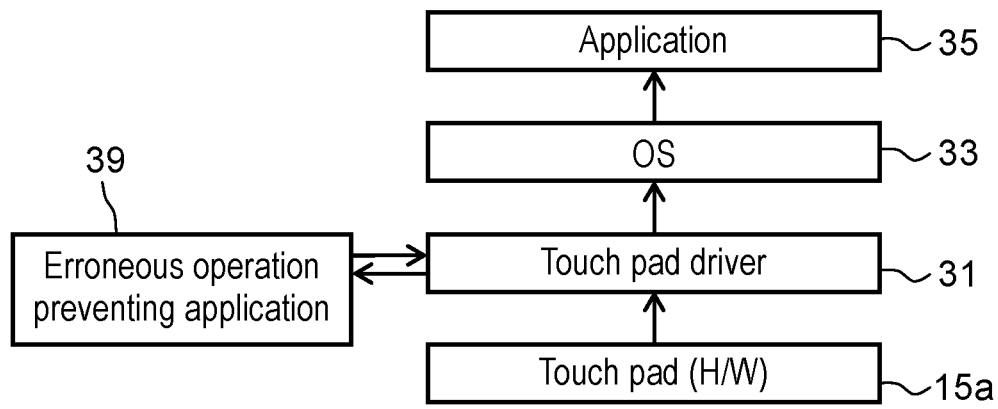
FIG. 14A is a diagram showing another example of the software configuration in the information processing device.

In an example shown in FIG. 14A, touch pad driver 31 transmits the detection signal of the touch operation received from touch pad 15a to erroneous operation preventing application 39. Erroneous operation preventing application 39 performs processing to the detection signal received from touch pad driver 31 in accordance with the foregoing flowcharts in FIGS. 5, 6. That is, erroneous operation preventing application 39 outputs (filters) only the detection signal detected in the region where the input function is not invalidated to touch pad driver 31. Touch pad driver 31 receives the detection signal received from erroneous operation preventing application 39 and converts the received detection signal to information indicating the touch operation, which information can be processed by Operating System (OS) 33, to transmit the information to Operating System (OS) 33.

Figure 14B:
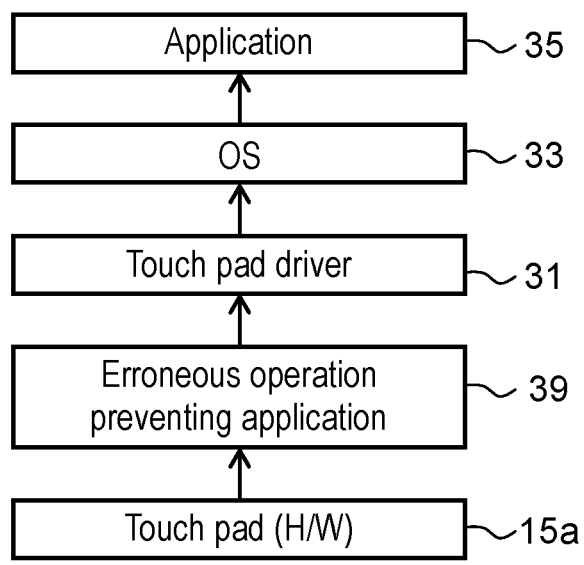
FIG. 14B is a diagram showing another example of the software configuration in the information processing device.

Alternatively, as shown in FIG. 14B, erroneous operation preventing application 39 may be intervened between touch pad 15a and touch pad driver 31. In this case, erroneous operation preventing application 39 receives the detection signal from touch pad 15a, and outputs, to touch pad driver 31, only the detection signal detected in the region where the input function is not invalidated in accordance with the foregoing flowcharts in FIGS. 5, 6. Touch pad driver 31 receives the detection signal from erroneous operation preventing application 39, and converts the detection signal to the information indicating the touch operation, which information can be processed by Operating System (OS) 33, to transmit the information to Operating System (OS) 33.

As described above, as the illustrations of the technique of the present disclosure, the exemplary embodiments have been described. For these, the accompanying drawings and detailed description have been provided.

Accordingly, of the components described in the accompanying drawings and the detailed description, not only essential components but non-essential components may be included to illustrate the above-described technique. Therefore, those non-essential components should not be recognized as the essential components because the non-essential components are described in the accompanying drawings and the detailed description.

Moreover, since the above-described exemplary embodiments are to illustrate the technique in the present disclosure, various modifications, replacements, additions, omissions and the like can be made in the scope of the claims or the equivalent scope thereof.

The present disclosure can be applied to an electronic device including an input function by touch operation, for example, a personal computer, a workstation, a smartphone, a tablet terminal or the like.

What is claimed is:

1. An electronic device comprising:
a keyboard that enables information to be input by operation of keys;
a touch operation part that enables information to be input by touch operation to a predetermined input region; and
a controller that controls validation and invalidation of an input function of the touch operation part,
wherein
the controller invalidates the input function to a partial region in the input region of the touch operation part,
the controller validates the input function to the partial region in a predetermined period, when predetermined touch operation is performed to a specific region where the input function in the input region is valid, while the input function to the partial region is invalidated,
the controller invalidates the input function to the partial region after the predetermined period has passed,
the controller validates the input function by the keyboard, while the input function to the partial region is invalidated,
the touch operation part and the keyboard are on a common surface of the electronic device,
the touch operation part is between an edge of the electronic device and the keyboard, and
a size of the partial region increases with decreased distance from the keyboard.

2. The electronic device according to claim 1, wherein the predetermined period is a certain period or a period when the touch operation is sensed in the input region.

3. The electronic device according to claim 1, wherein the predetermined touch operation includes a single tap to the touch operation part, a double tap to the touch operation part, and/or operation of continuing to touch the touch operation part in a certain period.

4. The electronic device according to claim 1, wherein the controller validates input to the partial region for specific operation, even while the input function to the partial region is invalidated.

5. The electronic device according to claim 1, wherein a size and/or a position of the specific region is changeable.

6. An input control method for controlling an electronic device including a touch operation part that enables information to be input by touch operation to a predetermined input region,
the input control method comprising:
invalidating an input function to a partial region in the input region;
validating the input function to the partial region in a predetermined period, if predetermined touch operation is performed to a specific region where the input function in the input region is valid, while the input function in the partial region is invalidated;

invalidating the input function to the partial region after the predetermined period has passed; and validating the input function by a keyboard configured to input information, while the input function to the partial region is invalidated, wherein the touch operation part and the keyboard are on a common surface of an electronic device, the touch operation part is between an edge of the electronic device and the keyboard, and a size of the partial region increases with decreased distance from the keyboard.

7. The input control method according to claim 6, wherein the predetermined period is a certain period or a period when the touch operation is sensed in the input region.

8. The input control method according to claim 6, wherein the predetermined touch operation includes a single tap to the touch operation part, a double tap to the touch operation part, and/or operation of continuing to touch the touch operation part in a certain period.

9. The input control method according to claim 6, wherein input to the partial region is validated for specific operation, even while the input function to the partial region is invalidated.

10. The input control method according to claim 6, wherein a size and/or a position of the specific region is changeable.

\* \* \* \* \*